United States Patent [19]

Vandersteen et al.

[11] Patent Number: 5,681,009
[45] Date of Patent: Oct. 28, 1997

[54] MISSILE HAVING ENDOATMOSPHERIC AND EXOATMOSPHERIC SEEKER CAPABILITY

[75] Inventors: Anthony D. Vandersteen, Cupertino; William C. Lynch, Los Altos, both of Calif.

[73] Assignee: Lockheed Missiles and Space Company, Sunnyvale, Calif.

[21] Appl. No.: 722,836

[22] Filed: Sep. 27, 1996

[51] Int. Cl.$^6$ .............................. F42B 15/01; G01J 5/02
[52] U.S. Cl. .............................................. 244/3.16; 250/347
[58] Field of Search ................................ 244/3.16, 3.15; 250/353, 347

[56] References Cited

U.S. PATENT DOCUMENTS

| | | | |
|---|---|---|---|
| 4,107,530 | 8/1978 | Brumfield et al. | 250/342 |
| 4,354,742 | 10/1982 | Abel et al. | 350/442 |
| 4,877,317 | 10/1989 | Gibbons et al. | 350/559 |
| 4,952,042 | 8/1990 | Pinson | 350/567 |
| 4,989,962 | 2/1991 | Kebo | 350/537 |
| 5,022,608 | 6/1991 | Beam | 244/3.18 |
| 5,049,740 | 9/1991 | Pines et al. | 250/235 |
| 5,113,281 | 5/1992 | Mandelboum et al. | 359/236 |
| 5,161,051 | 11/1992 | Whitney et al. | 244/3.16 |
| 5,529,261 | 6/1996 | Iddan | 244/3.16 |

*Primary Examiner*—Michael J. Carone
*Assistant Examiner*—Theresa M. Wesson
*Attorney, Agent, or Firm*—Henry J. Groth; W. Mark Biewlawski; Terry McHugh

[57] ABSTRACT

A seeker device, such as a seeker head, includes a housing for both a first optical assembly and a second optical assembly. In the preferred embodiment, the first optical assembly is an infrared telescope having a fixed, relatively narrow field of view for receiving incoming energy via a first path through an optical opening through the housing. The second optical assembly may be a pivotable mirror that is pivoted to provide a wide field of regard. The incoming energy that impinges the pivotable mirror enters through a second path through the optical opening. The energy from the pivotable mirror is redirected into the infrared telescope. In the preferred embodiment, the redirection is achieved by a dichroic mirror that has a high transmissivity with respect to long wave infrared energy and a high reflectivity with respect to mid wave infrared energy. In an exoatmospheric mode, the long wave infrared energy that passes through the dichroic mirror from the narrow field of view is utilized, while in an endoatmospheric mode mid wave infrared energy from the wide field of regard is utilized.

18 Claims, 2 Drawing Sheets

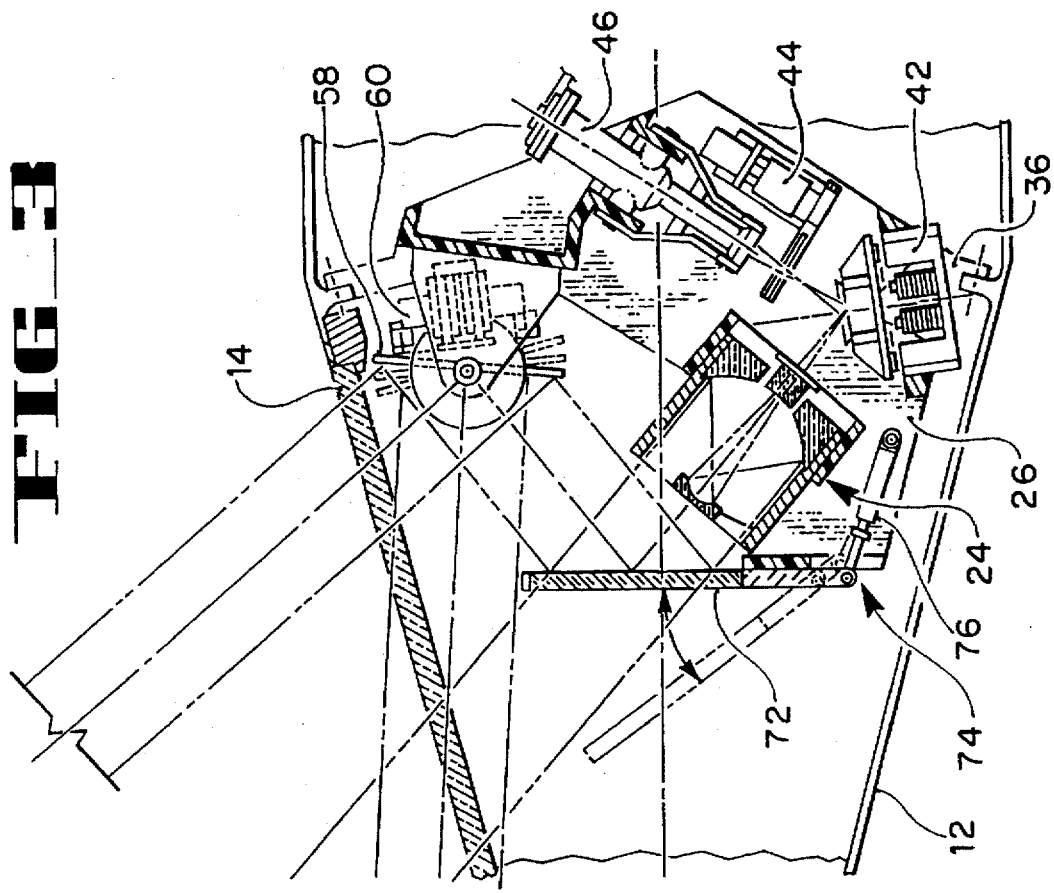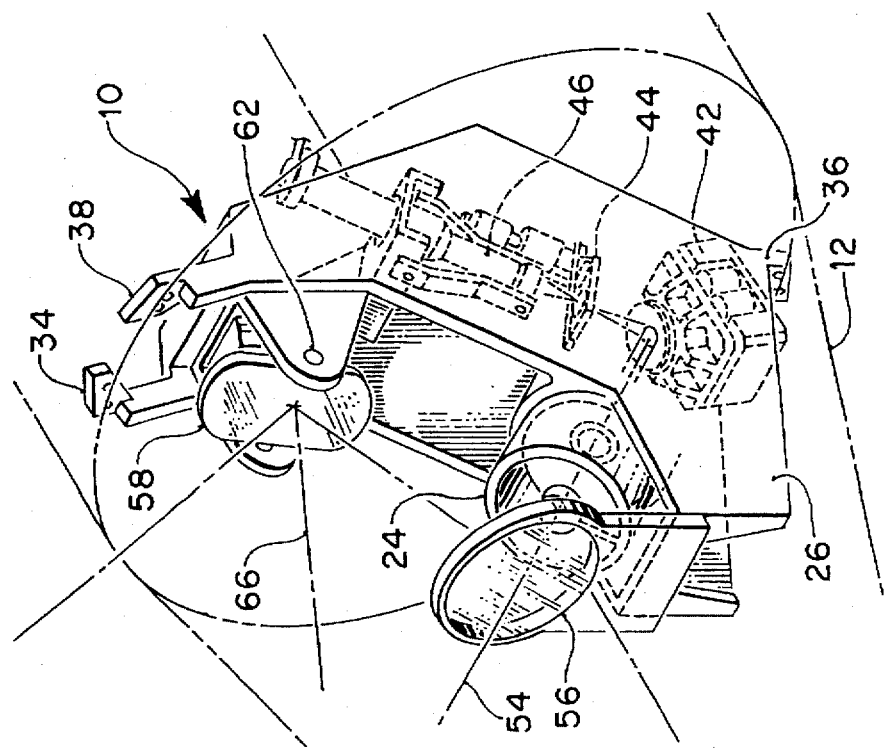

MISSILE HAVING ENDOATMOSPHERIC AND EXOATMOSPHERIC SEEKER CAPABILITY

TECHNICAL FIELD

The invention relates generally to optical devices for seeking a radiation-emitting target and more particularly to a seeker head for a missile having multiple modes of operation for seeking and acquiring radiation.

BACKGROUND ART

There are numerous applications for devices that optically detect radiation emitted from an object of interest. For example, a land-based seeker device may be used to detect and track an object that emits or reflects radiation. Optical seekers that illuminate a target and utilize the reflected radiation to track and/or identify the target are sometimes referred to as "active devices." In comparison, seekers that detect radiation emitted by the object of interest are referred to as "passive devices."

Seekers are also utilized in missiles. For example, a seeker head of a missile may be used for navigation and/or target detection. In addition to categorizing a seeker based upon its "active" or "passive" approach to detection, seekers can be categorized based upon the frequency bands of interest. Detection of millimeter waves (MMW) or infrared energy may be used for target acquisition, tracking and ranging. Within the infrared spectrum, long wave infrared (LWIR) seekers and mid wave infrared (MWIR) seekers are utilized. The selection of an appropriate sensor for a seeker depends upon a number of factors, particularly the intended mission of the missile.

An endoatmospheric missile is one that remains within the earth's atmosphere, i.e., at an altitude below 100 kilometers. For endo-atmospheric missions, three desirable sensor characteristics are a wide field of regard that includes radiation detection when the missile is at a low angle of attack (i.e., forward-looking detection), uncooled optics, and detection within the MWIR spectrum. Exoatmospheric missiles are capable of completing missions outside of the earth's atmosphere. Exoatmospheric missiles may be used to provide an orbital defense layer against hostile ballistic missiles. Typically, desired sensor characteristics for exoatmospheric missions include a narrow field of regard and LWIR detection. The field of regard for the sensor of an exoatmospheric missile is less sensitive to the angle of attack. However, providing sufficient cooling or a thermal operation is often more important than for endoatmospheric missiles.

U.S. Pat. No. 5,022,608 to Beam describes a seeker for an exoatmospheric missile. The missile is referred to as a kinetic kill vehicle (KKV) and is used to provide antisatellite capability. The KKV is a light-weight missile having on-board propulsion and guidance systems. The KKV differs from conventional missiles in that the vehicle is not equipped with a warhead, but instead delivers sufficient kinetic energy upon striking the target to disable or destroy the target. As described in Beam, the conventional seeker is an infrared sensor that receives energy from a target to determine a target angle relative to a boresight of the KKV. The measurements from the seeker are combined with body orientation sensed by a gyro-based altitude reference system, producing a target line-of-sight measurement. In comparison with the conventional approach, the Beam guidance system preferably uses a visible or ultra-violet sensor to resolve both stars and targets. The seeker generates two signals. The first signal is indicative of the angle between a longitudinal axis extending through the missile and the line of sight of the missile to the target. The second signal is indicative of the angle between the longitudinal axis extending through the missile and a line of sight between the missile and a celestial body, such as a star. From these two signals, a velocity vector for the missile propulsion system is calculated. The calculation is executed in a manner to guide the KKV so as to complete the intended mission.

In order to maximize the range of a missile having a given energy supply, designers attempt to minimize the weight of the various systems that comprise the missile. Regulating the weight is particularly important for exoatmospheric missiles, such as the KKV described in Beam. Another concern is the space requirement of each system within the missile. Consequently, the mass and the number of components required for target acquisition, tracking and ranging are important. Nevertheless, seekers having more than one mode of operation are known. The different modes of operation may be distinguishable by frequencies of interest, such as a system capable of sensing both in the millimeter wave spectrum and the infrared spectrum.

Alternatively, the modes may be related to fields of view. U.S. Pat. No. 4,107,530 to Brumfield et al., which is assigned to the assignee of the present invention, describes an infrared acquisition device having a wide field of view that can be reduced for fine tracking once target energy has come into focus. An optical system of the infrared acquisition device provides focus of the target onto a mosaic of separate detectors arranged in concentric fields. A first array of infrared detectors is used to provide the fine tuning. A second array of infrared detectors provides the wide field of view for the initial focusing. When the second array detects the target, the infrared energy is redirected to the first array and away from the second array.

Another type of seeker having more than one mode of operation is described in U.S. Pat. No. 5,529,261 to Iddan. In a search/seek mode, a seeker head extends out of the tip of a missile to allow a gimbal-mounted sensor to scan a wide field of view. However, after a target has been detected, the seeker head is retracted into the missile tip so as to improve the aerodynamic continuum of the missile. While the field of regard is narrower when the seeker head is in the retracted condition, the field of regard is sufficiently wide to permit reliable tracking after the target has been detected.

While significant advances have been realized in the design of seekers, what is needed is a seeker device that accommodates both exoatmospheric requirements and endoatmospheric requirements, without placing high demands on available space and without a substantial increase in total weight.

SUMMARY OF THE INVENTION

A seeker device has an exoatmospheric mode of operation in which a first optical assembly forms a narrow and preferably fixed field of view for receiving incoming energy via a first path through an optical opening. The seeker device also includes a second optical assembly for providing a wide field of regard and for receiving incoming energy via a second path through the optical opening. The incoming energy from the wide field of regard is directed into the first optical assembly, so that components for collecting, focusing and sensing optical energy are not duplicated.

In the preferred embodiment, the first optical assembly is an infrared telescope mounted within the housing of a missile. The infrared telescope is mounted to have a direct line of sight through the optical opening, with the line of sight being off-axis of the missile housing, suitable for exoatmospheric flight. The second optical assembly is preferably a mirror that is pivoted to define the wide field of regard. At one extent of the field of regard, the line of sight of a pivotable mirror provides a low angle of attack potential, as measured with respect to the axis of the missile housing, which is required for endoatmospheric flight.

In the preferred embodiment, the seeker device includes a second mirror which is a dichroic mirror that is selective with respect to transmission of bands of frequencies. The dichroic mirror is preferably fixed in place. In the fixed embodiment, the dichroic mirror has a high transmissivity with respect to long wave infrared (LWIR) energy within the narrow field of view of the telescope. The dichroic mirror is in the direct line-of-sight axis of the telescope through the optical opening of the housing. The rear surface of the dichroic mirror is highly reflective with respect to mid wave infrared (MWIR) energy. The pivotable mirror is positioned to direct energy onto the rear surface of the dichroic mirror, so that the MWIR is reflected by the dichroic mirror into the infrared telescope. Thus, the dichroic mirror enables two modes of operation with a single fixed element.

In an alternative embodiment the second mirror is displaceable and band selectivity is not critical. That is, the second mirror may be replaced with a more conventional mirror or other assembly for redirecting the energy from the pivotable mirror to the telescope. In the exoatmospheric mode, the mirror is removed from the direct line-of-sight axis of the telescope. In the endoatmospheric mode, the displaceable mirror is switched into the line of sight of the telescope. As in the fixed dichroic mirror embodiment, the energy from the pivotable mirror is reflected at the internal surface of the displaceable mirror to direct the energy into the telescope.

The collected and focused energy from the telescope is directed to a sensor that converts the optical signal into an electrical signal representative of the collected radiation. The sensor may be a focal plane array (FPA) or a Dewar, but this is not critical. Mode switching can take place downstream of the telescope. For example, a switching filter assembly may be used to select between filtering MWIR and LWIR prior to optical signal sensing.

As previously noted, the optical elements are preferably cryogenically cooled for exoatmospheric operation. In the preferred embodiment, the optical elements of the telescope are made of silicon carbide, which has stiffness approaching that of beryllium and a desirable coefficient of thermal expansion close to that of an optical bench which may be a structure made of aluminum-doped graphite epoxy, for example. This substantially matches the thermal expansion of the silicon carbide optics, so that the optical system remains in focus under dynamic thermal environments. The combination of cryogenic cooling and the selection of the materials provides a substantially athermal design which also reduces the thermal noise contribution of the mirrors to the total noise at the sensors (FPA). In the exoatmospheric mode, the preferred embodiment uses cryogenically cooled optical elements, including the window, second mirror, telescope and other optical elements in the line of sight to the sensor FPA. One method of removing heating effects from the window is to eject the window (by a suitable actuator device) from the seeker forecone after the missile is in the exoatmosphere.

Another advantage of the invention is that the multi-mode capability is achieved with a substantially small number of additional components. For the preferred embodiment in which the dichroic mirror is fixed in position, the mirror eliminates the need for moving components in order to switch modes, eliminates the need for a pre-launch command to select either the wide field of regard for endoatmospheric operation or the narrow field of view for exoatmospheric operation, and allows simultaneous split band spectra to be present at the focal plane, so that a single in-flight command to the internal filter can be used to select between LWIR and MWIR wavelength bandpass. Alternatively, a dual FPA/Dewar or a single dual-band FPA, such as a gallium arsenide multiple quantum device, could eliminate the need for filtering, thereby eliminating all mode switching. Also, the use of cryo-cooled optical elements increases the effective range in the exoatmospheric mode by increasing the signal-to-noise ratio of the seekers.

BRIEF DESCRIPTION OF THE DRAWINGS

FIG. 2 is a perspective view of the seeker device of FIG. 1.

FIG. 3 is a side sectional view of a portion of a seeker head having a displaceable mirror in accordance with a second embodiment of the invention.

BEST MODE FOR CARRYING OUT THE INVENTION

Figure 1:
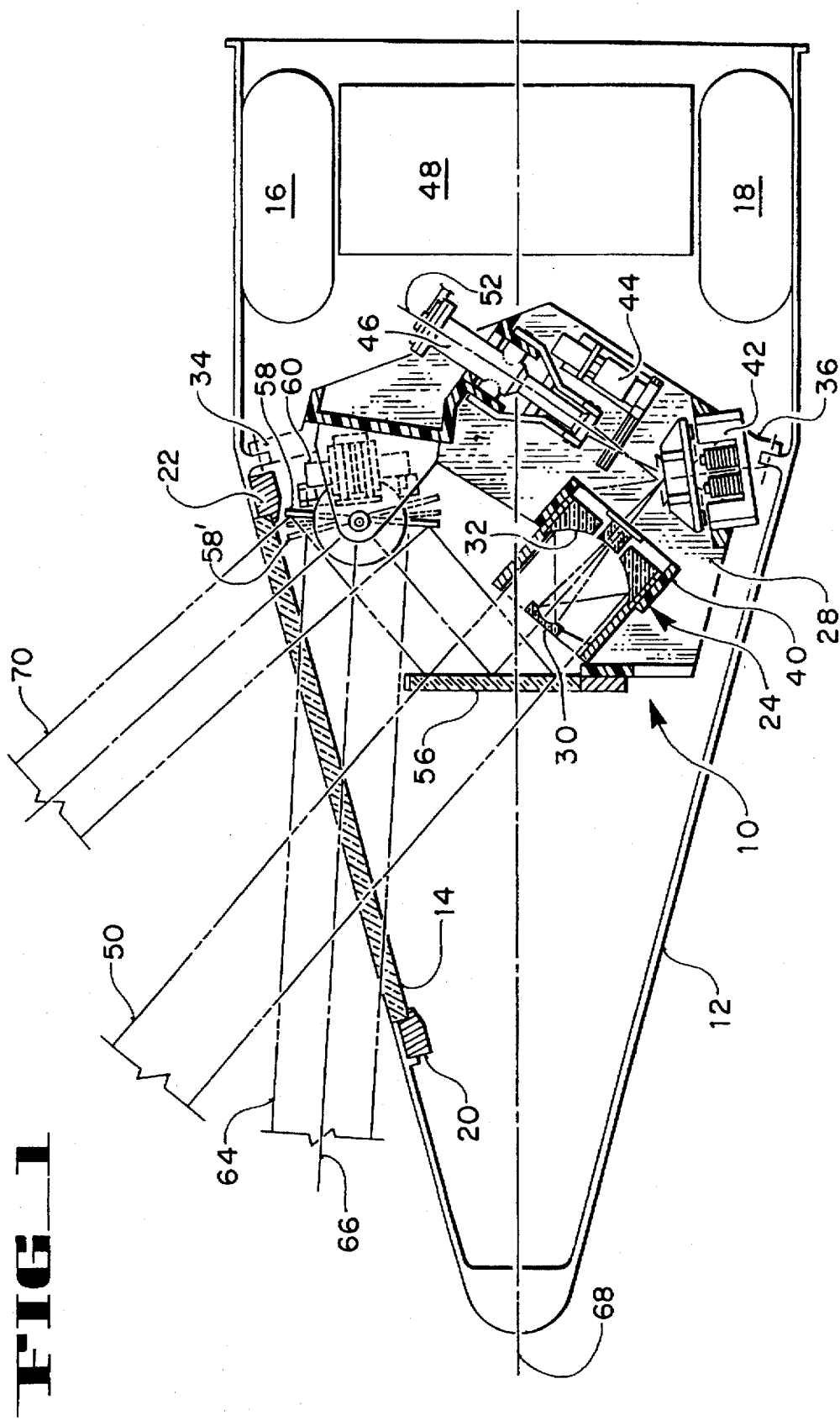
FIG. 1 is a side sectional view of a multi-mode seeker head having a fixed dichroic mirror in accordance with a first embodiment of the invention.

With reference to FIGS. 1 and 2, a seeker device 10 is shown as being contained within a housing 12. In the preferred embodiment, the seeker device is an infrared seeker housed within a head of a missile. For example, the embodiment of FIGS. 1 and 2 may be a seeker head for a kinetic kill vehicle.

The housing 12 may be formed of materials conventional to seeker heads. The housing includes an optical opening 14, which may be a silicon window having an antireflective coating or may be an opening. However, the optical opening may be formed by removing a section of the housing following a launch. Typically, a seeker head is protected by a shroud during a launch. The protective shroud is jettisoned when the seeker device 10 is to be activated.

The window 14 that forms the optical opening is transparent to the frequencies of interest. In the preferred embodiment, the seeker device 10 is used to detect infrared energy. Coolant systems 16 and 18 are used to regulate the temperature of the window 14. Since thermal expansion of the window will affect the passage of infrared energy through the window, the operation of the coolant system to thermally regulate the window enhances the performance of the seeker device 10. The window 14 is connected to the metallic portion of the housing 12 by fasteners 20 and 22. The type of fastener is not critical to the invention.

Within the housing 12 is an infrared telescope 24 for collecting and focusing infrared energy. The telescope 24 and other components of the seeker device 10 are attached to a mounting structure 26. In the preferred embodiment, the optical elements 28, 30 and 32 for collecting and focusing infrared radiation are formed of silicon carbide. The arrangement of optical elements is conventional and well known in the art. However, the use of silicon carbide provides a stiffness that approaches that of beryllium and provides a desirable low coefficient of thermal expansion to achieve an athermal operation and to minimize thermally induced optical distortion. The use of cryo-cooled optics reduces the likelihood that the optical signal formed by the telescope will be adversely affected by "thermal noise."

In order to accommodate thermal expansion by the silicon graphite optical elements 28, 30 and 32, the mounting structure 26 is preferably formed of aluminum-doped graphite epoxy, which has a thermal expansion coefficient that approaches that of silicon carbide. However, these specific materials are not critical to the invention. As will be explained more fully below, the other components of the seeker device 10 are attached to the one-piece mounting structure 26 which functions as an optical bench. The arrangement allows the device to remain in focus within dynamic thermal environments.

The mounting structure 26 is attached to the housing 12 by brackets 34, 36 and 38 and fastening members, not shown. This allows the seeker device 10 to be removed as a single unit. However, such a capability is not critical to the invention.

The telescope 24 may be fixed to the mounting structure 26 by an annular member 40, but preferably is in direct thermal contact with the thermal expansion-matched mounting structure 26. The telescope is cryogenically cooled using the coolant systems 16 and 18. For example, liquid argon or other such cryogenic coolant may be used. Cryogenically cooling the telescope reduces the thermal noise produced by the optics at the focal plane, thereby allowing the seeker device 10 to have a greater range with respect to acquiring infrared energy. Cryogenic coolant systems are well known by persons skilled in the art.

As previously noted, the mounting structure 26 is connected to the housing 12 by brackets. In addition to allowing the seeker device 10 to be installed and removed as a single unit, this arrangement provides some thermal isolation of the seeker device from the exterior walls of the housing 12. This thermal isolation and the selection of materials for the mounting structure and the telescope 24 achieve a substantially athermal operation of the seeker device.

The optical signal from the telescope 24 is reflected by a fast steering mirror 42. The fast steering mirror is used to provide signal stabilization. That is, the component is designed to reduce or eliminate jitter that is caused by movement of the missile during a mission. A fast steering mirror is not critical to the invention.

The optical signal that is reflected at the fast steering mirror 42 is passed through a switched filter assembly 44 to a sensor 46. Acceptable types of sensors are focal plane arrays (FPA) and Dewar sensors. In the preferred embodiment, the seeker device 10 is capable of multiple modes of energy detection. The switched filter assembly may be used to selectively pass frequency bands. For example, the filter assembly may have two separate wavelength bandpass filters, one for MWIR and the other for LWIR. Depending upon the mode of operation of the seeker device 10, the first or second filter is positioned along the path of the optical signal. Other filtering assemblies may be substituted without effect on the invention. In fact, bandpass filtering may not be necessary if the sensor 46 includes a dual band focal plane. For example, the sensor 46 may have a gallium arsenide dual band multiple quantum well focal plane that permits presence of simultaneous split band spectra.

As is well known in the art, the sensor 46 converts an optical signal into a corresponding electrical signal. The electrical signal is conducted to a signal processor 48 for target identification, tracking and/or homing. The circuitry of the signal processor is conventional to the art.

In operation, the telescope 24 has a fixed, narrow field of view, as represented by lines 50 in FIG. 1. The narrow field of view is designed for energy detection within an exoatmospheric mode of operation for the seeker device 10. In the preferred embodiment, the frequency band of interest is LWIR. Where the switched filter assembly 44 is utilized, the appropriate filter is positioned along an optical axis 52 from the fast steering mirror 42 to the sensor 46.

The field of view 50 of the telescope 24 has a line-of-sight axis 54 (shown in FIG. 2) that passes through a dichroic mirror 56. The dichroic mirror is selective with respect to transmission of frequencies. In the preferred embodiment, the dichroic mirror has a high transmissivity with respect to LWIR, but is highly reflective on the rear surface with respect to MWIR. Thus, the LWIR has a direct path through the optical opening 14 to the telescope 24. Infrared energy is collected and focused by the telescope, and an optical signal is directed to the sensor 46.

In an endoatmospheric mode of operation, the telescope 24 receives energy via a path through the optical opening 14 that is different than the path defined by the narrow field of view 50. A pivotable mirror 58 establishes a field of regard that is significantly wider than the field of view 50 of the telescope 24. A motor 60 pivots the pivotable mirror about axis 62 (shown in FIG. 2).

One of the extreme positions of the pivotable mirror 58 is shown in phantom 58' in FIG. 1 as providing a field of view 64 for missions having a low angle of attack. The low angle of attack is the lo angle measurement between the line-of-sight axis 66 of the field of view 64 and the longitudinal axis 68 of the missile housing 12. At the other extreme of the pivotable mirror 58, the field of view is shifted to position 70. The field of regard in the endoatmospheric mode of operation is the complete scan from the low angle of attack of view field position 64 to the view field position 70.

Throughout the range of motion of the pivotable mirror 58, the energy reflected from the pivotable mirror impinges the rear surface of the dichroic mirror 56, which has a high reflectivity with respect to MWIR. The angle of the dichroic mirror relative to the telescope 24 directs the reflected MWIR into the telescope. In the endoatmospheric mode, the switched filter assembly 44 filters out any LWIR that is received via the path through the dichroic mirror 56.

The dichroic mirror 56 preferably has a transmissivity of at least 75% for the LWIR energy. The reflectivity for the MWIR is preferably at least 75%. However, lower level transmissive and reflective characteristics can be implemented without diverging from the invention.

In the embodiment of FIGS. 1 and 2, the dichroic mirror 56 is fixed in position. The fixed dichroic mirror eliminates need for a pre-launch command to select between the wide field of regard for the endoatmospheric mode and the narrow field of view 50 of the exoatmospheric mode of operation. However, in some applications, a displaceable mirror may be desirable. Referring now to the embodiment of FIG. 3, a conventional mirror 72 is selectively removed from the direct line of sight of the telescope 24 when the seeker device 74 is in the exoatmospheric mode. Consequently, the telescope will receive all of the energy that passes through the window 14. As in the embodiment of FIGS. 1 and 2, a switched filter assembly 44 or other known means may be used to remove or disregard the MWIR energy that is collected and focused by the telescope 24. In the embodiment of FIG. 3, many of the components are duplicated from the embodiment of FIGS. 1 and 2. Therefore, reference numerals are also duplicated.

When the seeker device 74 is switched from the exoatmospheric mode to the endoatmospheric mode, the displaceable mirror 72 is pivoted by a mirror controller 76 to the position in front of the telescope 24. As a result, incoming energy that is reflected by the pivotable mirror 58 impinges the rear surface of the displaceable mirror 72 and is reflected into the telescope 24. The operation in the endoatmospheric mode is identical to that described with reference to FIGS. 1 and 2. However, in the second embodiment, the mirror 72 does not need to be a dichroic mirror. Any reflective device that redirects the incoming energy to the telescope 24 may be used.

While the invention has been described and illustrated as being housed within a missile, this is not critical. The multi-mode seeker device having a fixed narrow field of view and having a separate wide field of regard may be utilized in other embodiments, including land-based seekers.

We claim:

1. A seeker device comprising:
    a housing having an optical opening;
    a first optical assembly within said housing for forming an optical signal, said first optical assembly having a first field of view for receiving incoming energy via a first path through said optical opening;
    a second optical assembly within said housing, said second optical assembly having a field of regard wider than said first field of view, said second optical assembly having a second field of view for receiving incoming energy via a second path through said optical opening; and
    means for directing said energy of said second field of view into said first field of view.

2. The device of claim 1 wherein said first optical assembly includes a telescope for collecting and focusing said energy, said telescope having a direct line of sight through said optical opening.

3. The device of claim 2 wherein said means for directing includes a dichroic mirror within said direct line of sight, said dichroic mirror having a high optical transmissivity for said incoming energy via said first path, said dichroic mirror having a rear surface with a high reflectivity for said energy directed from said second optical assembly.

4. The device of claim 3 wherein said second optical assembly includes a reflective member positioned to direct said incoming energy via said second path so as to impinge said rear surface of said dichroic mirror adjacent to said telescope.

5. The device of claim 4 further comprising a motor means for selectively pivoting said reflective member through a range of angles in which said reflective member directs said energy to impinge said rear surface, thereby defining said field of regard.

6. The device of claim 1 wherein said means for directing includes a displaceable mirror having an endoatmospheric mode of operation in which said displaceable mirror is positioned to inhibit receiving incoming energy via said first path, said displaceable mirror having an exoatmospheric mode of operation in which said displaceable mirror is positioned to inhibit said directing of energy of said second field of view into said first field of view.

7. The device of claim 1 wherein said housing is a missile and said first optical assembly is an infrared telescope having silicon carbide elements, said infrared telescope being mounted to an aluminum-doped, graphite epoxy structure to enhance athermal operation.

8. The device of claim 1 further comprising a sensor for receiving said optical signal and means for selecting between long wave infrared detection and mid wave infrared detection employing said sensor.

9. The device of claim 8 wherein said means for selecting includes a switched filter.

10. A seeker head for a missile comprising:
    a housing having a window;
    an infrared telescope having a direct line-of-sight axis through said window, said telescope having a first field of view which is substantially fixed relative to said housing;
    a pivotable mirror off-axis of said line-of-sight axis of said telescope, said pivotable mirror having a second field of view, said pivotable mirror being mounted within said housing to accommodate movement that defines a field of regard substantially wider than said first field of view; and
    a second mirror positioned relative to said pivotable mirror to reflect energy from said pivotable mirror to enter said infrared telescope.

11. The seeker head of claim 10 wherein said second mirror is a dichroic mirror fixed in position along said direct line-of-sight axis, said dichroic mirror having a high transmissivity to infrared energy entering said housing along said direct line-of-sight axis, said dichroic mirror having a high reflectivity to infrared energy impinging a rear surface from said pivotable mirror, said rear surface being at a side of said dichroic mirror adjacent to said telescope.

12. The seeker of claim 10 wherein said second mirror is displaceable between an endoatmospheric seek position for reflecting said energy from said pivotable mirror and an exoatmopsheric seek position in which said energy from said pivotable mirror remains outside of said telescope.

13. The seeker head of claim 10 wherein said telescope has silicon carbide elements and is cryogenically cooled, said telescope being mounted to an aluminum-doped, graphite epoxy structure to enhance athermal operation.

14. The seeker head of claim 10 further comprising a sensor for receiving optical signals from said telescope.

15. The seeker head for a missile comprising:
    means for collecting and focusing infrared energy from a fixed field of view;
    means for pivoting an optical element through a wide field of regard, said pivoting means being off-axis of said collecting means;
    means for directing infrared energy from said optical element into said collecting means;
    sensor means for generating a signal representative of infrared energy received from said collecting means; and
    switching means for selecting between an endoatmospheric mode of operation in which said sensor means is primarily responsive to infrared energy from said pivoting means and an exoatmospheric mode of operation in which said sensor means is primarily responsive to infrared energy entering said fixed field of view along a direct line of sight exclusive of said pivoting means.

16. The seeker head of claim 15 wherein said collecting means is a telescope and said switching means is a filter for selecting between filtering long wave infrared energy and mid wave infrared energy.

17. The seeker head of claim 15 wherein said directing means is a fixed dichroic mirror positioned to pass infrared energy along a path within said fixed field of view of said collecting means, said fixed dichroic mirror being reflective to radiation energy from said pivoting means.

18. The seeker head of claim 17 wherein said pivoting means includes a pivotally mounted mirror.

* * * * *